Dec. 12, 1933.   R. G. CANTI ET AL   1,939,103
AIR FILTER FOR STERILIZERS
Filed Feb. 20, 1931   3 Sheets-Sheet 1

Inventor:
Ronald George Canti
Joseph Charlton Robinson
By Spear, Donaldson & Hall
Attys

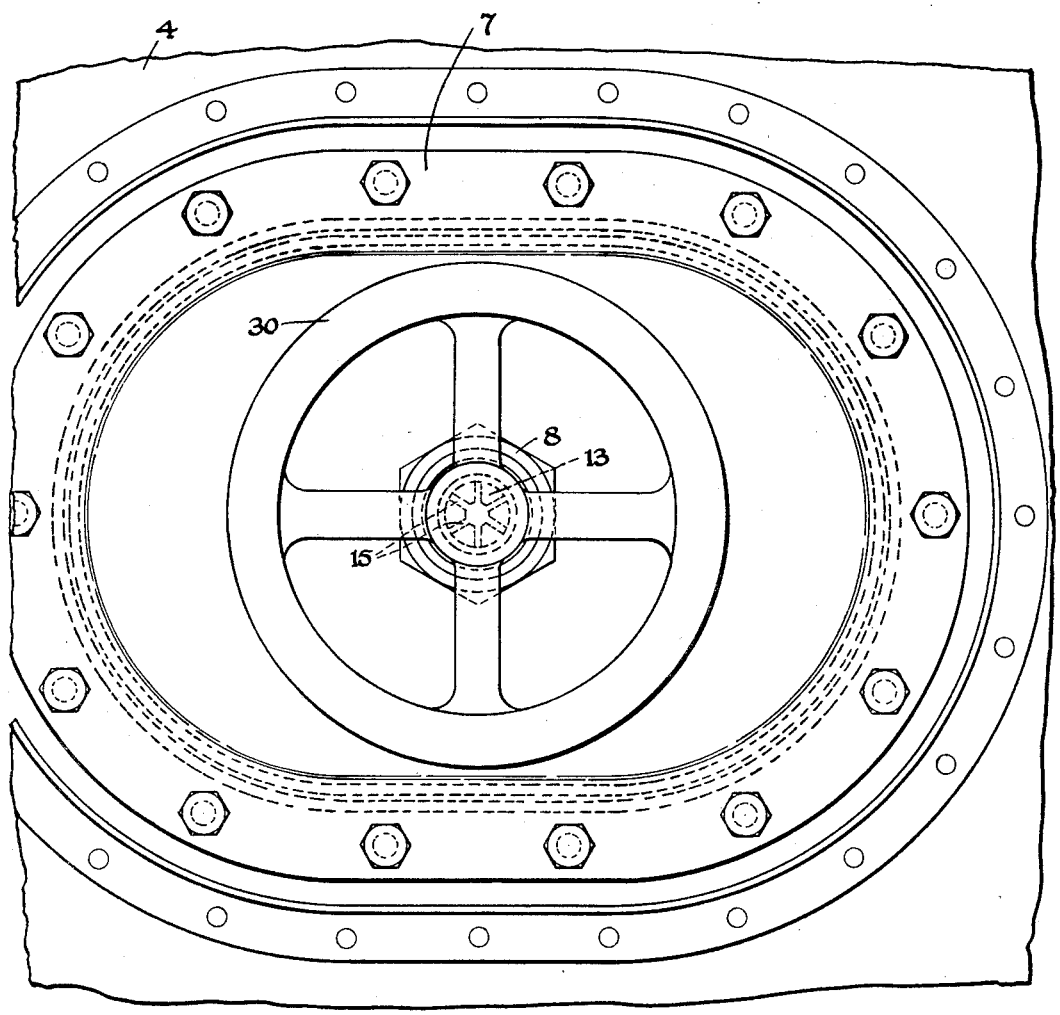

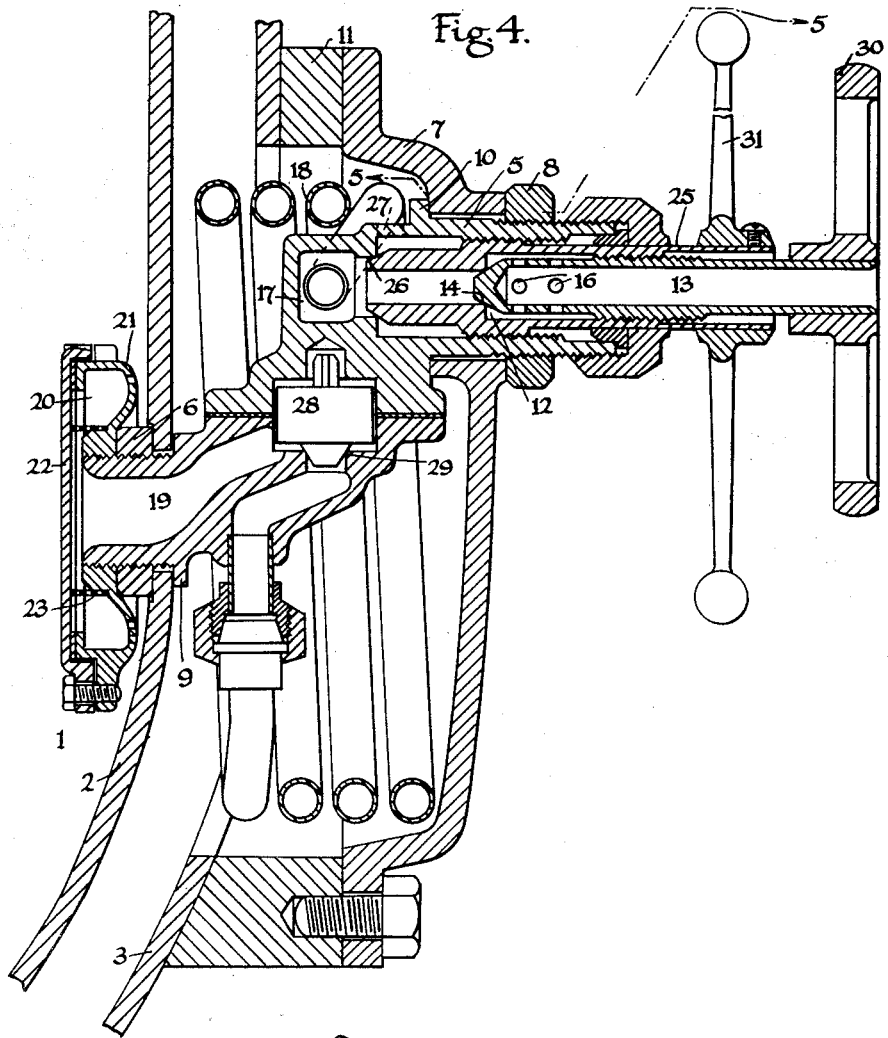
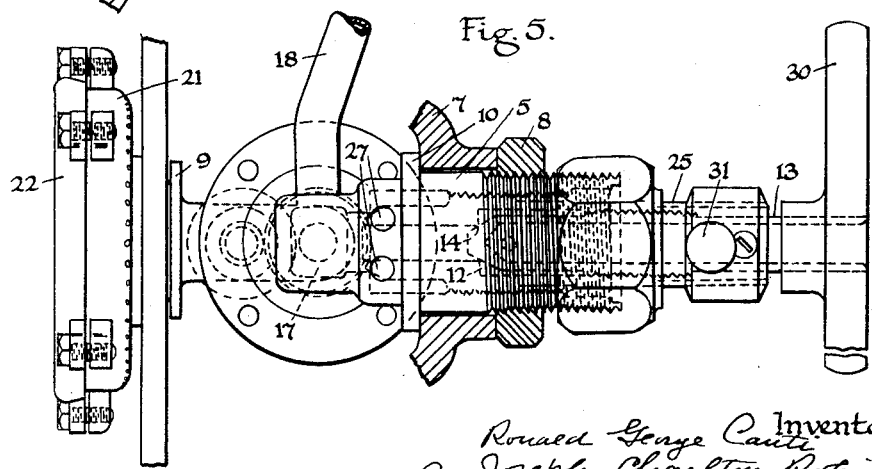

Patented Dec. 12, 1933

1,939,103

UNITED STATES PATENT OFFICE 1,939,103

AIR FILTER FOR STERILIZERS

Ronald George Canti and Joseph Charlton Robinson, London, England

Application February 20, 1931, Serial No. 517,374, and in Great Britain March 27, 1930

10 Claims. (Cl. 167—3)

This invention relates to sterilizers and disinfecting and like apparatus, employed for the treatment by steam of surgical instruments, gloves, dressing, flasks and other scientific apparatus, bacteriological and other media or any material, which when sterilized must be protected from contact with air contaminated with active bacteria.

Sterilizing apparatus of the character indicated in the preceding paragraph are as a rule provided with an air inlet comprising a conduit connecting the steam chamber of the sterilizer with the atmosphere, said conduit leading at the outer end from a filter operating to filter the air before its admission to the sterilizing chamber, a valve being interposed between the filter and the chamber, so as to regulate the flow of air.

It will be appreciated, however, that with a construction of this description, the filter and its housing may become contaminated with bacteria from the outside air, and although the filter may arrest some bacteria and other impurities as air is drawn through it, it is possible for air induced into the sterilizing chamber, for example, by the action of a vacuum ejector operating upon the interior of the chamber or by condensation of vapour within said chamber, to percolate between the filter and the walls of its housing, and thereby convey impurities to the sterilizing chamber; or the filtering medium, especially if damp, may become infected with bacteria and they may be drawn into the chamber by the intake of air.

One object of the present invention is to provide an air filtering device for sterilizing apparatus wherein the air is completely and surely filtered and sterilized and remains so however long the apparatus is used.

According to the present invention, there is provided an air filter arranged so as to be mounted upon a sterilizing chamber so that the filtering medium thereof is subject to the same sterilizing action as the chamber.

In a suitable construction according to the invention, an air filter for sterilizing apparatus comprises a cylindrical body member, one end of which is arranged to extend exteriorly of a double-walled sterilizing chamber and the other end of which is arranged to extend into the said sterilizing chamber. The outer end of the body member is provided with an axially arranged valve to control the admission of air to the sterilizing chamber, the outlet opening of the said valve being arranged within the space provided by the double walls of the sterilizing chamber and is arranged in communication with one end of a coiled pipe disposed between the double walls of the filtering chamber and the other end of which is arranged in communication with an axial passage formed in the body member and communicating with the interior of the sterilizing chamber. The arrangement is such that the air during its travel becomes heated by the steam admitted to the space between the double walls of the sterilizing chamber before entering the interior of the said chamber. The inlet end of the body member is provided with a container arranged to hold a filtering medium through which the air flows before entering the chamber.

In a modification of the invention the air filter is associated with an inlet valve arranged to control the admission of steam to the sterilizing chamber, the arrangement being such that the steam is caused to pass through the filtering medium before entering the said chamber.

It is, of course, well known to dispose a filter mounted upon a valve in the inside of a closed vessel.

In order that the invention may be fully understood, reference is directed to the accompanying drawings, wherein:—

Figure 3 is an end view of Figure 1;

Figure 4 is a sectional elevation of a modified form of air filter constructed in accordance with the invention and including means whereby steam may be admitted to the sterilizing chamber, and Figure 5 is a section on the line 5—5 of Figure 4;

Figure 1:
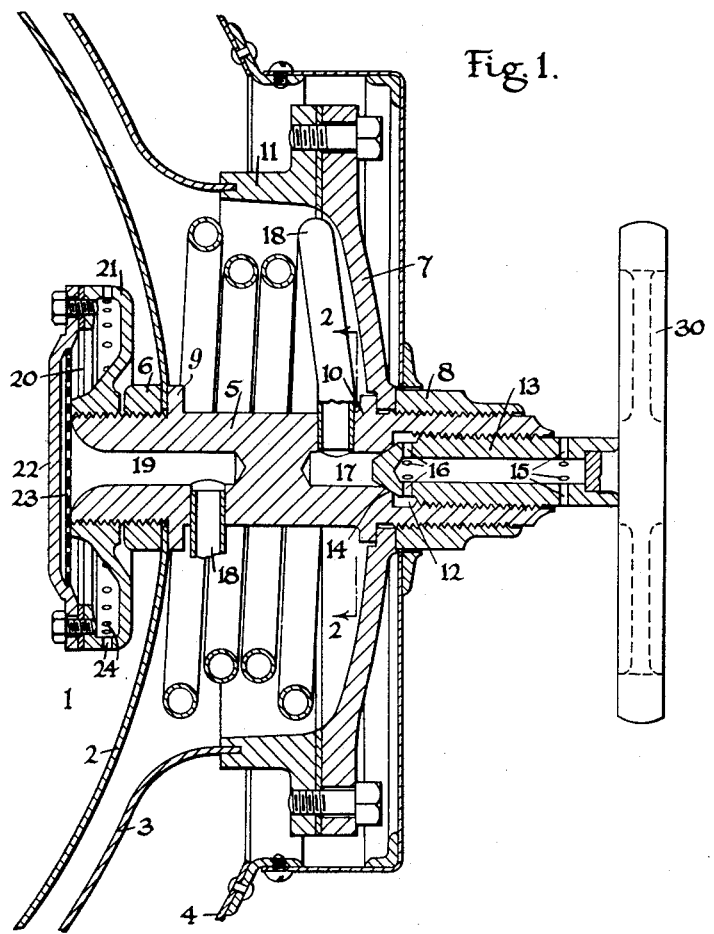
Figure 1 is a sectional elevation of an air filter device constructed in accordance with the invention, and shown applied to one end of a sterilizing chamber.
Figure 2:
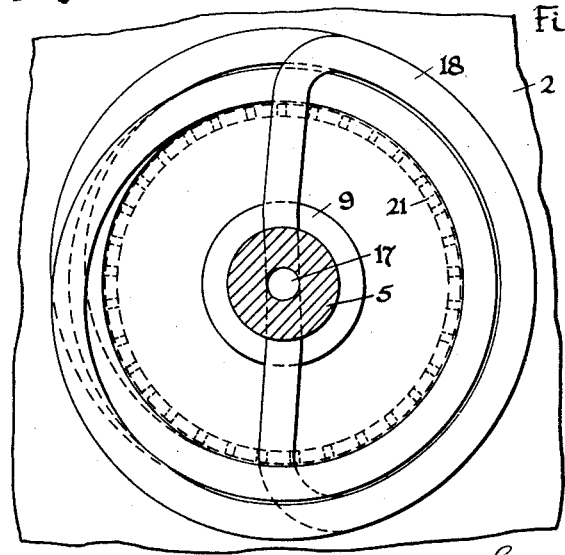
Figure 2 is a section on the line 2—2 of Figure 1.

Referring to the drawings, there is illustrated an air filter 1 applied to one end of a sterilizing chamber 2 constructed with a double wall 3 and an outer casing 4. The air filter comprises a body member 5 which is secured at the inner end thereof to the inner wall of the sterilizing chamber 2 by means of a nut 6 and at the outer end to a cover plate 7 by means of a screw sleeve 8, a pair of peripheral flanges 9 and 10 being formed on the said body member 5 to facilitate such attachment. The cover plate 7 is bolted to a manhole 11 secured to the double wall 3 of the sterilizing chamber 2. The body member 5 is provided at the outer end with an axial passage 12 which is screw-threaded to receive a tubular valve member 13, the inner end of which is arranged to seat upon a valve seating 14. The valve member 13 is provided at the outer end with a series of radial passages 15 and at the inner end with a similar series of passages 16 which permit air to enter a recess 17 when the valve is opened. The recess 17 communicates by means of a coiled pipe 18, with an axial passage 19 provided at the inner end of the said body member 5. The inner end of the body member 5 supports a filter chamber 20 which comprises a dished annular member 21 to which is attached a closure plate 22 arranged to support a filter 23. It will thus be seen that when the valve 13 is open, air will enter the radial passages 15 and 16, coiled pipe 18, recess 19 through the filter medium 23 and thence into the interior of the sterilizing chamber, through a series of circumferential holes 24 provided in the dished annular member 21.

With this construction, air entering the chamber is heated by the steam admitted to the space between the double walls of the sterilizing chamber before passing to the interior of the said chamber, and it will be appreciated that as the air filter is disposed within the sterilizing chamber, the filtering medium is subjected to a sterilizing action and the filter chamber 20 is also completely sterilized each time a sterilizing operation is conducted, so that air enters the said chamber thoroughly sterilized by filtration through the sterile medium.

Figure 4 illustrates a construction of air filter somewhat similar to that illustrated in Figure 1 with the exception that means are provided whereby steam may be admitted to the sterilizing chamber in addition to air, as in the previous construction. In Figure 4 the tubular valve 13 is fitted within a valve sleeve 25 which is arranged in screw-threaded engagement with the body member 5, the inner end of the said valve sleeve 25 co-acting with a valve seat 26 and serving to control the admission of steam. The inner end of the valve 13 co-acts with a valve seat 14 as previously described, and serves to control the admission of air.

Steam is admitted to the valve body, from the space formed by the double walls of the sterilizing chamber, through a pair of ports 27 so that when the valve sleeve 25 is moved into the open position, the steam will flow by way of the coiled pipe 18 to the recess 19 and thence through the filtering medium 23 to the sterilizing chamber. A weighted non-return valve 28 is provided within the steam pipe 18 to equalize the pressure existing in the sterlizing chamber and that prevailing in the space between the double walls of the said chamber, the said weight being arranged to seat upon a seating 29. Air is admitted to the sterilizing chamber by means of the valve 13 as in the previous construction and flows through orifices 16 and thence through the coiled pipe 18 to the recess 19 from which recess the air passes through the filtering medium 23 to the sterilizing chamber 2.

The valve member 13 and the valve sleeve 25 are actuated through the medium of a handle 30 and a double lever 31 respectively.

What we claim and desire to secure by Letters Patent of the United States is:—

1. In a sterilizer, the combination comprising a steam jacketed sterilizing chamber, a valve-controlled air inlet in the wall of said chamber, an air filter covering the delivery orifice of said inlet, which filter is located within the sterilizing chamber and a pre-heating coil for the air admitted to the air inlet, which coil is located within the steam jacket of the sterilizing chamber.

2. In a sterilizer, the combination comprising a steam jacketed sterilizing chamber, a valve-controlled air inlet in the wall of said chamber, an air filter covering the delivery orifice of said inlet, which filter is located within the sterilizing chamber, and a pre-heating coil for the air admitted to the air inlet which coil is located within the steam jacket of the sterilizing chamber, a valve-controlled steam inlet in the wall of said chamber admitting steam from the steam jacket through the pre-heating coil and through the air filter into the sterilizing chamber.

3. In a sterilizer, the combination comprising a steam jacketed sterilizing chamber, a valve-controlled air inlet in the wall of said chamber, an air filter covering the delivery orifice of said inlet which filter is located within the sterilizing chamber, a pre-heating coil for the air admitted to the air inlet, which coil is located within the steam jacket of the sterilizing chamber and means to admit steam from the said steam jacket through the interior of the said coil and through the air filter into the sterilizing chamber.

4. In a sterilizer comprising in combination a sterilizing chamber, and a valve-controlled air inlet in the wall of said chamber, an air filter covering the delivery orifice of said inlet, which filter is located within the sterilizing chamber.

5. In a sterilizer comprising in combination a sterilizing chamber and a valve controlled air inlet in the wall of said chamber, an air filter covering the delivery orifice of said inlet, which filter is located within the sterilizing chamber and means to admit steam to said air inlet.

6. In a sterilizer comprising in combination a sterilizing chamber, an inlet in the wall of said chamber for the admission of air and steam separately thereto, and valve means controlling said inlet and adapted selectively to admit therethrough either air or steam, an air filter associated with the said inlet and located within the sterilizing chamber.

7. In a sterilizer comprising in combination a steam jacketed sterilizing chamber and a valve controlled air inlet in the wall of the said chamber, an air filter covering the delivery orifice of said inlet, which filter is located within the sterilizing chamber and means to admit steam from the steam jacket of the sterilizing chamber to said inlet thereby admitting either air alone or steam alone to the sterilizing chamber.

8. In a sterilizer comprising in combination a steam jacketed sterilizing chamber and a valve controlled air inlet in the wall of said chamber, an air filter covering the delivery orifice of said inlet, which filter is located within the sterilizing chamber, means to admit steam from the steam jacket of the sterilizing chamber to said air inlet and a weighted non-return valve disposed in the path of said steam between the interior of the jacket and the orifice of the said air inlet for the purpose of equalizing the pressure in the jacket and the sterilizing chamber.

9. In a sterilizer, comprising in combination a steam jacketed sterilizing chamber and a valve controlled air inlet in the wall of said chamber, an air filter covering the delivery orifice of said inlet, which filter is located within the sterilizing chamber, a valve controlled steam inlet from the steam jacket of the sterilizing chamber to said air inlet and a weighted non-return valve disposed in the path of the steam between the interior of the jacket and the air inlet for the purpose of equalizing the pressures in the jacket and the sterilizing chamber.

10. In a sterilizer, comprising in combination a sterilizing chamber and a valve controlled air inlet in the wall of said chamber, an air filter covering the delivery orifice of said inlet, which filter is located within the sterilizing chamber, whereby the air is subjected to a filtering action prior to admission through said valve-controlled air inlet.

RONALD GEORGE CANTI.
JOSEPH CHARLTON ROBINSON.